United States Patent
Bullard et al.

(10) Patent No.: US 7,385,526 B1
(45) Date of Patent: Jun. 10, 2008

(54) VEHICLE LOCATING DEVICE

(76) Inventors: Joseph Bullard, 4746 Wales St., Lakewales, FL (US) 33859; Virginia Bullard, 4746 Wales St., Lakewales, FL (US) 33859

( * ) Notice: Subject to any disclaimer, the term of this patent is extended or adjusted under 35 U.S.C. 154(b) by 68 days.

(21) Appl. No.: 11/399,464

(22) Filed: Apr. 7, 2006

(51) Int. Cl.
*B60Q 1/48* (2006.01)
*G08G 1/14* (2006.01)

(52) U.S. Cl. .............. 340/932.2; 340/425.5; 340/468

(58) Field of Classification Search ........ 340/932.2, 340/988, 989, 425.5, 468, 471, 472, 485, 340/487, 539.1, 539.11, 539.13
See application file for complete search history.

(56) References Cited

U.S. PATENT DOCUMENTS

| | | | |
|---|---|---|---|
| 4,976,410 A * | 12/1990 | Tomaiuolo | 248/514 |
| 5,388,546 A | 2/1995 | Lombard | |
| 5,786,758 A * | 7/1998 | Bullock | 340/539.32 |
| 5,933,081 A | 8/1999 | Jones | |
| 6,023,218 A * | 2/2000 | Tremblay | 340/425.5 |
| D432,945 S | 10/2000 | Icenhour | |
| 6,129,035 A * | 10/2000 | Schweinberger | 116/28 R |
| 6,239,701 B1 * | 5/2001 | Vasquez et al. | 340/539.32 |
| 6,246,314 B1 * | 6/2001 | Djaid | 340/425.5 |
| 6,298,803 B1 | 10/2001 | Gregg | |
| 6,378,453 B1 | 4/2002 | Conway | |
| 6,580,368 B1 * | 6/2003 | Jacobs | 340/539.11 |
| 6,637,365 B1 * | 10/2003 | Adamski | 116/28 R |
| 7,119,679 B1 * | 10/2006 | Crom | 340/539.32 |
| 2004/0164861 A1 * | 8/2004 | Rawson | 340/539.32 |

* cited by examiner

Primary Examiner—Toan N Pham

(57) ABSTRACT

A wireless vehicle identification assembly includes a portable controller that generates and sends a wireless locating signal. The locating signal has a preprogrammed verification data stream encoded therein. A flag assembly is mounted to a top ledge of a window of the vehicle and includes a flag that is and pivotally connected thereto. The flag assembly is formed from non-corrosive material. A mechanism is included for lowering and raising the flag when the flag assembly receives the wireless locating signal from the portable controller. A mechanism is included for automatically illuminating a distal end of the flag after the flag is articulated to the raised position. The illuminating mechanism automatically deactivates when the flag is articulated to the lowered position. The automatic illuminating mechanism is coupled to a vehicle internal power source.

15 Claims, 7 Drawing Sheets

VEHICLE LOCATING DEVICE

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to locating devices and, more particularly, to a vehicle locating device for determining a location of a parked vehicle in a crowded parking lot.

2. Prior Art

People often times go to the mall, to the airport or to sporting events where they park there vehicle among hundreds of other vehicles. After spending several hours going about their business, it is not uncommon for persons to forget exactly where they had previously parked their vehicle. This is rather inconvenient, especially if the person is carrying heavy parcels or bags, or if it is late at night and the parking area is poorly lit. The latter situation is also dangerous for woman or the elderly that are by themselves. As such, several attempts have been made to assist people in locating their vehicle in large parking areas.

One prior art example discloses a vehicle locator device that includes a base adhesively attached to the exterior roof surface of an automotive vehicle. A connector member is pivotally mounted on the base, and a cylindrical mast attachment member is pivotally attached to the connector member. The multiple pivot connections enable the mast to be adjusted between a prone, or inactive, position lying against the automobile roof surface, and an upstanding, or active, position projecting generally vertically upwardly from the roof surface. A flag is attached to the upper end of the mast to provide an indication of the vehicle location when the vehicle is parked in a crowded parking lot.

One disadvantage of the locator device is that when the mast is in the prone position, it is likely to rattle against the roof surface, especially when the vehicle is moving on rough roads or through light winds. The pivotal connections further promote such rattling. Another disadvantage of the device is that the device is adhesively attached to the roof surface. Over time, the adhesive connection would tend to mar the finish on the roof surface. Also, the device is conspicuous in the prone position; thus, some motorists might consider the device to detract from the appearance of the vehicle. Further, while the vehicle is moving, with the device in the prone position, the flag would very likely flap back and forth in the vehicle wind-stream, thereby creating an annoying flapping sound.

A further disadvantage of the device is that when the mast is in its active or upstanding position, the flag may not be readily visible to the motorist located far away from the vehicle. A flag, formed of a flexible cloth material, would tend to hang downwardly alongside the mast, so as to be relatively inconspicuous when viewed from points far away from the vehicle. Yet another problem is that the various pivotable connections are formed by screws that require screw driver adjustment to achieve a desired friction drag. Most motorists do not want to keep a screw driver on hand for adjustment purposes.

Accordingly, a need remains for a vehicle locating device in order to overcome the above-noted shortcomings. The present invention satisfies such a need by providing a vehicle locating device that is easy and convenient to use, durable in design, and improves the security of the user. Instead of searching aimlessly through a parking lot for a misplaced car, the raised flag or light directs the person straight towards their vehicle. This saves a considerable amount of time and effort, especially when carrying heavy bags after shopping or when searching for the parked car in a thunderstorm. The system proves especially useful to forgetful individuals, women, night shift workers, and single travelers by minimizing the amount of time spent wandering around parking lots at night, which might pose a personal security risk.

BRIEF SUMMARY OF THE INVENTION

In view of the foregoing background, it is therefore an object of the present invention to provide a vehicle locating device. These and other objects, features, and advantages of the invention are provided by a wireless vehicle identification assembly for determining a location of a parked vehicle in a crowded parking lot.

The wireless vehicle identification assembly includes a portable controller for generating and sending a wireless locating signal based upon a user input. Such a wireless locating signal has a preprogrammed verification data stream encoded therein.

A flag assembly is removably mounted to a top ledge of a window of the vehicle. Such a flag assembly includes a flag that is directly and pivotally connected thereto such that the flag is free to swivel along an arcuate path located to an exterior of the vehicle. The flag assembly is formed from non-corrosive material.

Such a flag assembly preferably includes a U-shaped bracket that has medial and lateral sides seated to an interior and an exterior of the vehicle window. The U-shaped bracket has a bottom layer formed from rubber material that covers an entire surface area of the bottom layer such that the U-shaped bracket maintains frictional contact with the vehicle window. A housing is directly coupled to the lateral side of the U-shaped bracket and positioned to an exterior of the vehicle. Such a housing has a continuous hollow chamber formed therein and an open top end such that the chamber is in fluid communication with ambient surroundings. The actuating assembly is partially seated within the chamber.

A mechanism is included for selectively lowering and raising the flag between the raised and lowered positions when the flag assembly receives the wireless locating signal from the portable controller. The flag lowering and raising mechanism preferably includes a receiver in wireless communication with the transmitter. Such a receiver receives the wireless locating signal. A signal verification circuit is electrically coupled to the receiver. The signal verification circuit detects and decodes the verification data stream such that an identity of the portable controller can advantageously and effectively be validated before the flag is pivoted. An actuating assembly is electrically coupled to the signal verification circuit and the flag respectively. The signal verification circuit generates and transmits first and second dependent control signals to the actuating assembly for instructing the actuating assembly to pivot the flag and activate the illuminating mechanism respectively. The first and second control signals are simultaneously generated and transmitted during operating conditions.

The flag actuating assembly may include an electric motor that is electrically coupled to a vehicle power supply source. Such a motor includes a drive shaft and a cam directly coupled to a distal end thereof such that the drive shaft and the cam effectively rotate in sync about a circular path when the motor is activated. An elongated piston has a bottom end directly connected to the cam. Such a piston is rotatable about a first axis when the cam rotates. The bottom end has a hook shape for effectively locking with the cam. An arm is pivotally mounted to the housing and has a bottom flange offset therefrom. Such a bottom flange is directly and statically coupled to a top end of the piston such that the arm is effectively caused to pivot about a second axis as the piston rotates about the first axis. The first and second axes are non-parallel.

A mechanism is included for automatically illuminating a distal end of the flag after the flag is articulated to the raised position such that the illuminating mechanism automatically deactivates when the flag is articulated to the lowered position. Such an automatic illuminating mechanism is electrically coupled to a vehicle internal power source. The automatic illuminating mechanism may include a sensor that is electrically coupled to the signal verification circuit. Such a sensor effectively receives the second control signal. A switch and a bulb are electrically coupled directly thereto. Such a switch is medially disposed between the bulb and an external power supply source such that the bulb effectively receives power when the switch is adapted to a closed position. The sensor generates and transmits a control signal for toggling the switch between an open position and the closed position when the flag is pivoted to the lowered and raised positions respectively such that the bulb simultaneously and automatically illuminates when the flag is maintained at the raised position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
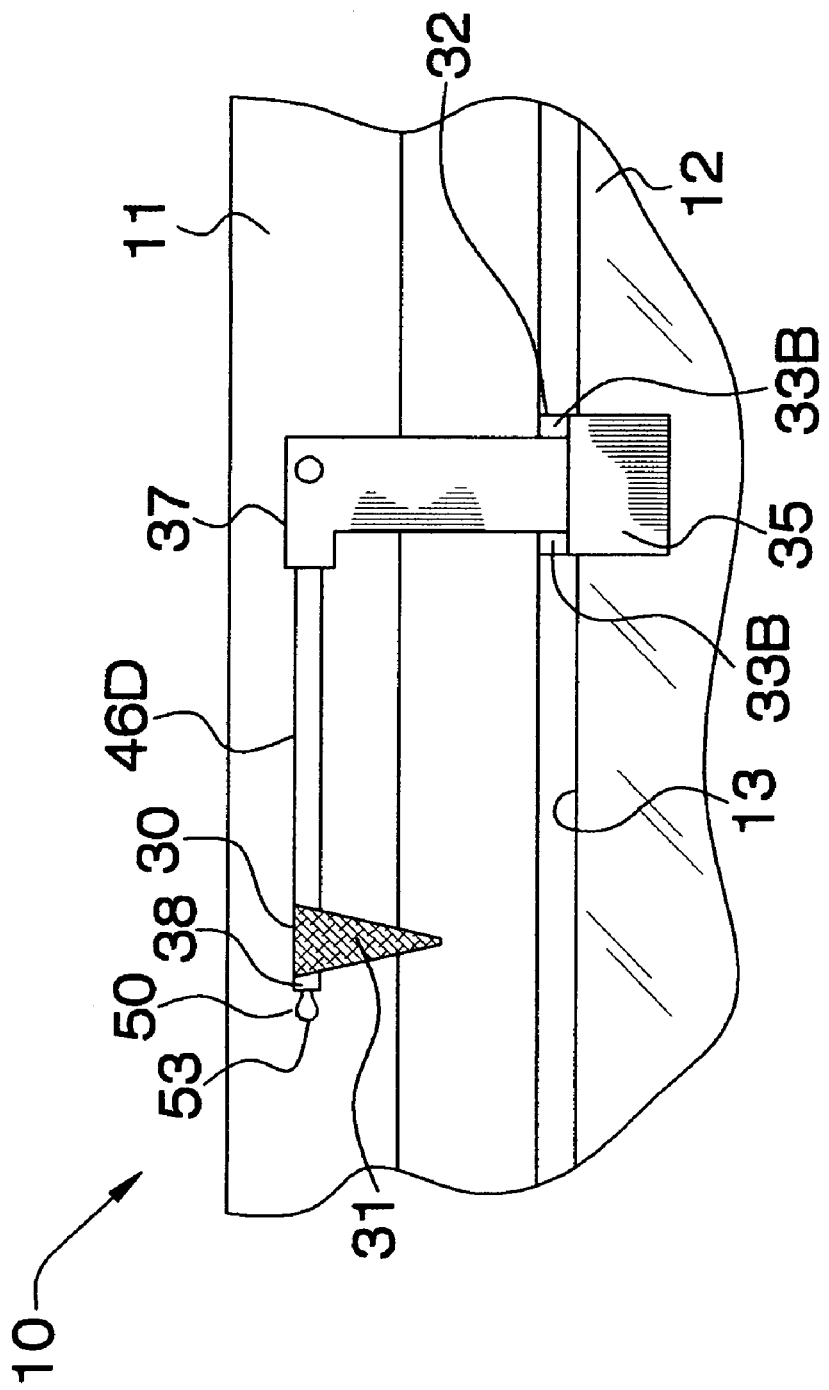
FIG. 1 is a side-elevational view showing a vehicle locating assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1-8 by the reference numeral 10 and is intended to provide a vehicle locating assembly. It should be understood that the assembly 10 may be used to locate many different types of vehicles and should not be limited in use to only locating vehicles in mall parking lots.

Figure 6:
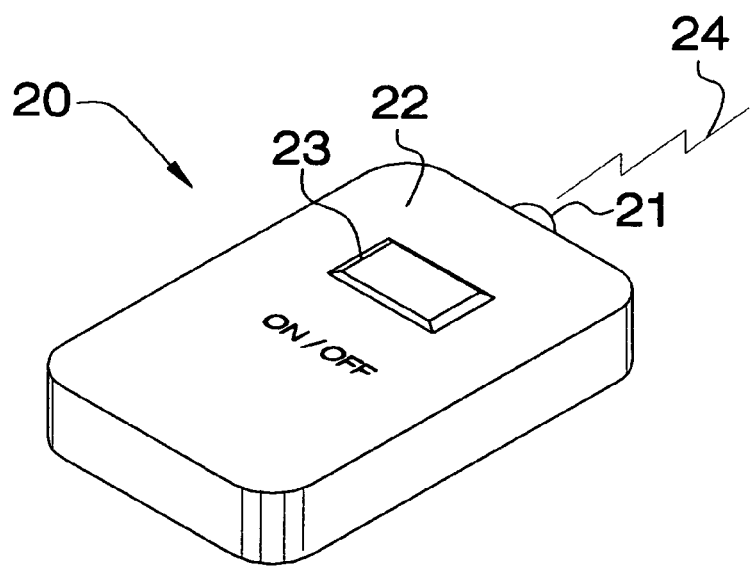
FIG. 6 is a perspective view showing a portable controller, in accordance with the present invention.
Figure 8:
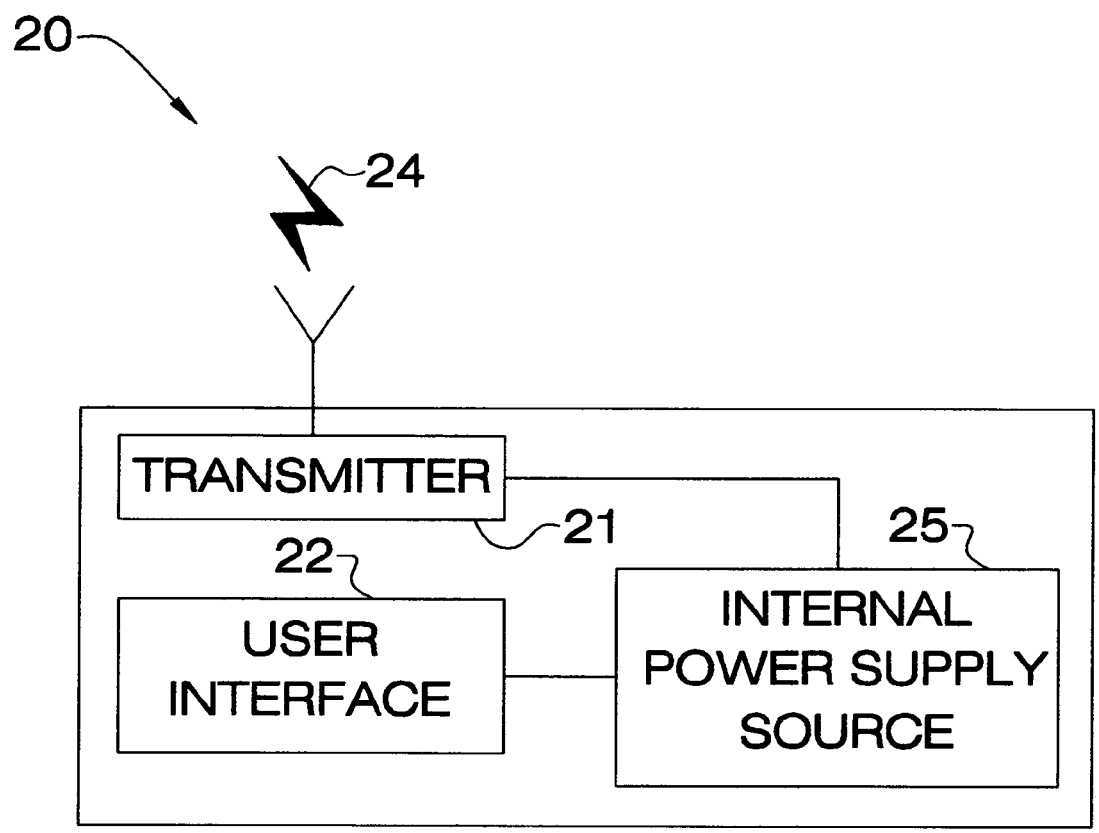
FIG. 8 is a schematic block diagram of the portable controller shown in FIG. 6.

Initially referring to FIGS. 6 and 8, the assembly 10 includes a portable controller 20 that has a transmitter 21 that is important for generating and sending a wireless locating signal 24 based upon a user input. Such a wireless locating signal 24 has a preprogrammed verification data stream encoded therein that is vital for allowing the assembly 10 to distinguish among various locating signals 24 from other vehicle locating assemblies 10 that may be operating in the vicinity of the vehicle 11. The portable controller 20 further includes a user interface 22 consisting of a button 23 that the user can depress for selectively activating and deactivating the assembly 10. Of course, the user interface 22 may include further buttons 23 that activate other functions, like a panic button, as is obvious to a person of ordinary skill in the art. An internal power supply source 25 is disposed within the portable controller 20 and is electrically coupled to the transmitter 21 and the user interface 22 for conveniently and effectively providing an operating power thereto.

Figure 2:
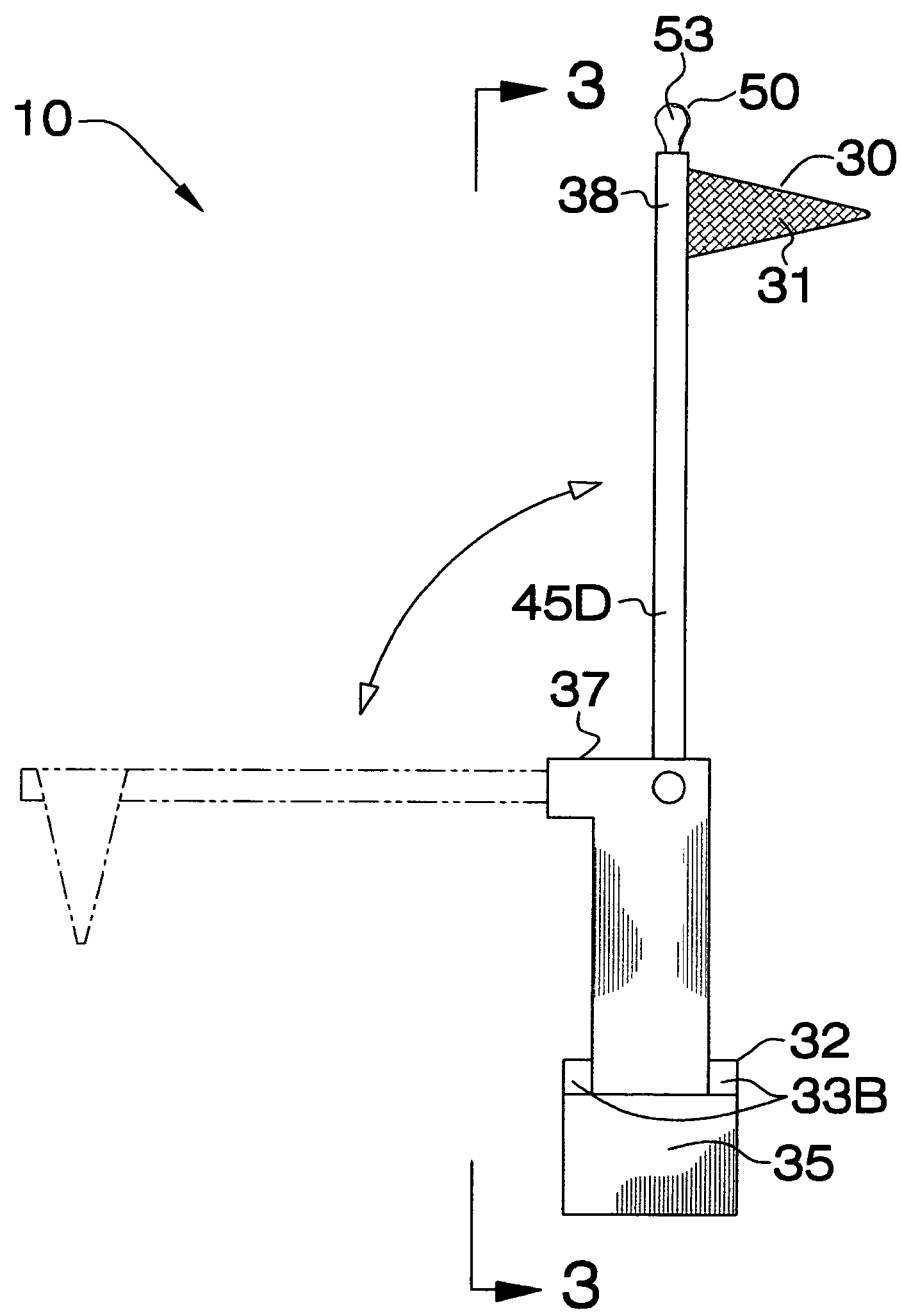
FIG. 2 is an enlarged side-elevational view of the assembly shown in FIG. 1, showing the flag at a raised position.

Referring to FIGS. 1 and 2, a flag assembly 30 is removably mounted to a top ledge 13 of a window 12 of the vehicle 11. Such a flag assembly 30 includes a flag 31 that is directly and pivotally connected thereto, without the use of intervening elements, which is essential such that the flag 31 is free to swivel along an arcuate path located to an exterior of the vehicle 11. The flag assembly 30 is formed from non-corrosive material, which is a crucial feature for ensuring that the assembly 10, and particularly the flag 31, will no be adversely affected by extended periods of exposure to sunlight, rain and other weather conditions. Of course, the flag 31 may be produced in a variety of alternate shapes, sizes and colors, and may have surface indicia imprinted thereon, as is obvious to a person of ordinary skill in the art.

Figure 3:
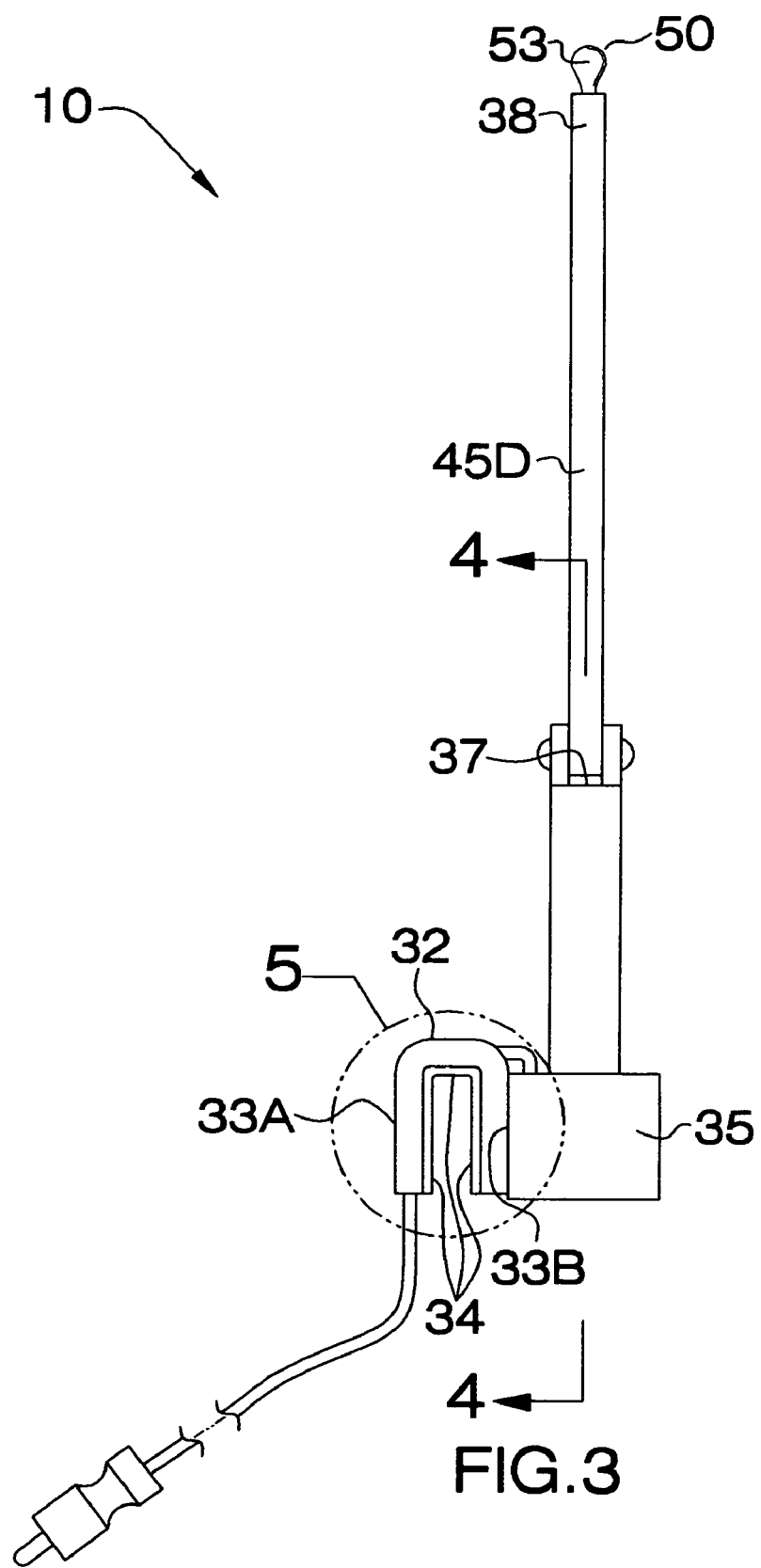
FIG. 3 is a front-elevational view of the assembly shown in FIG. 2, viewed along line 3-3.

Referring to FIGS. 1, 2, 3, 4 and 5, such a flag assembly 30 includes a U-shaped bracket 32 that has medial 33A and lateral 33B sides seated to an interior and an exterior of the vehicle window 12, respectively. The U-shaped bracket 32 has a bottom layer 34 formed from rubber material that covers an entire surface area of the bottom layer 34, which is vital such that the U-shaped bracket 32 maintains frictional contact with the vehicle window 12 while not causing any damage thereto. A housing 35 is directly coupled, without the use of intervening elements, to the lateral side 33B of the U-shaped bracket 32 and is positioned to an exterior of the vehicle 11, as is best shown in FIG. 3. Such a housing 35 has a continuous hollow chamber 36 formed therein and an open top end 37 such that the chamber 36 is in fluid communication with ambient surroundings. Of course, the chamber 36 may have a closed top end 37 for effectively isolating the chamber 36 from its ambient surroundings, as is obvious to a person of ordinary skill in the art. The actuating assembly 43 (described herein below) is partially seated within the chamber 36.

Figure 4:
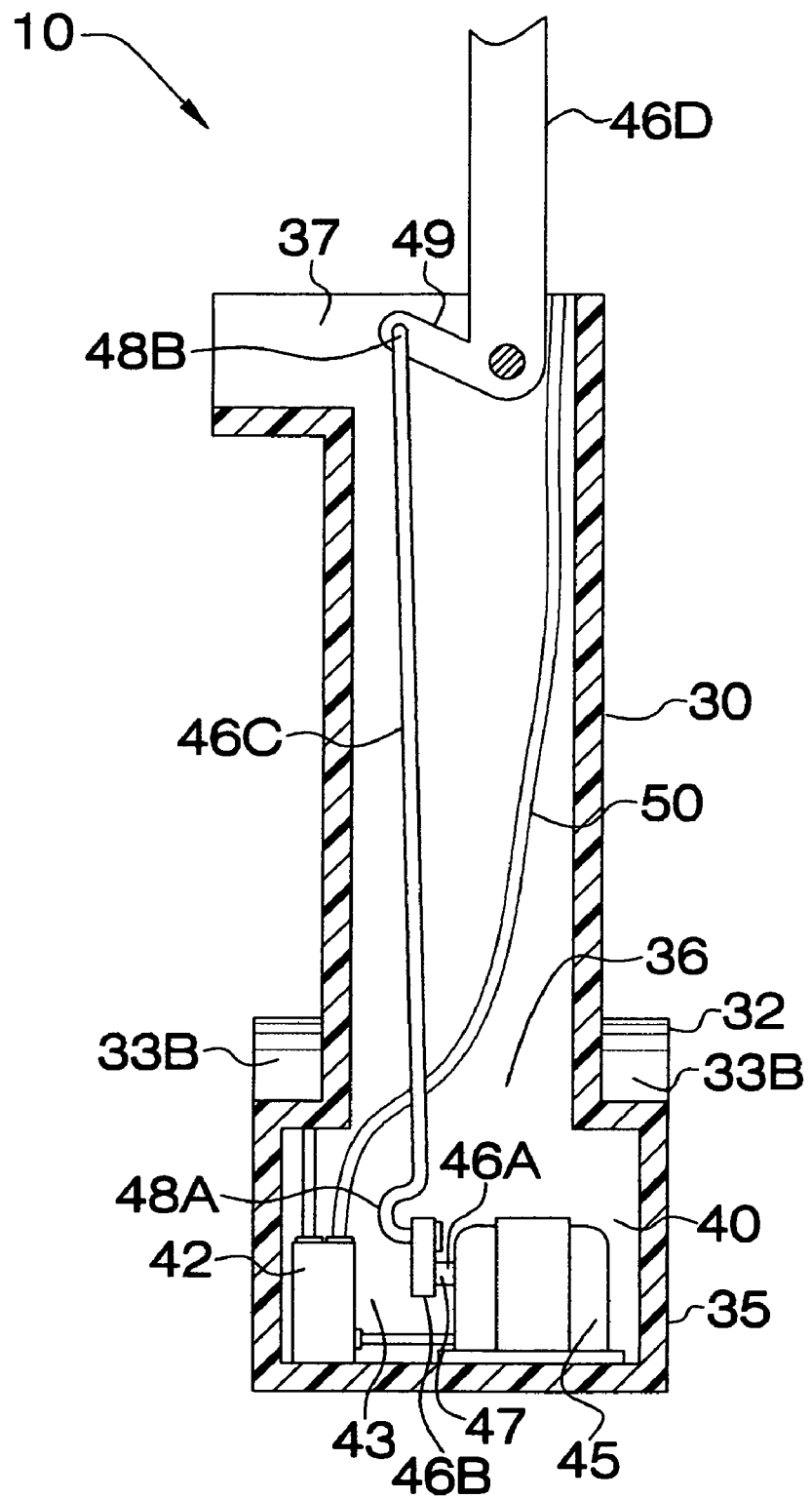
FIG. 4 is a cross-sectional view of the assembly shown in FIG. 3, taken along line 4-4.
Figure 5:
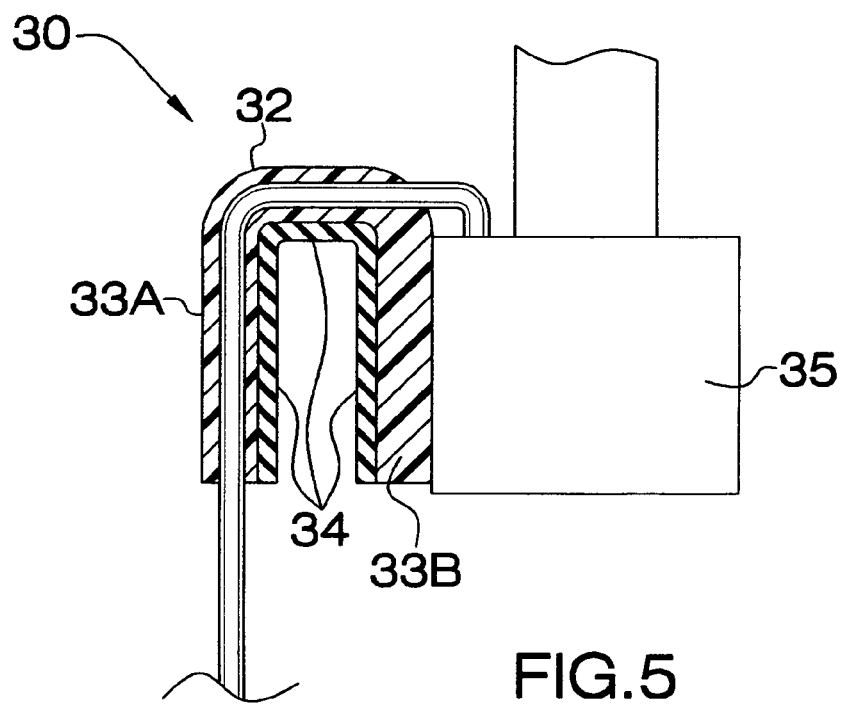
FIG. 5 is an enlarged cross-sectional view of the U-shaped bracket shown in section 5 of FIG. 3.
Figure 7:
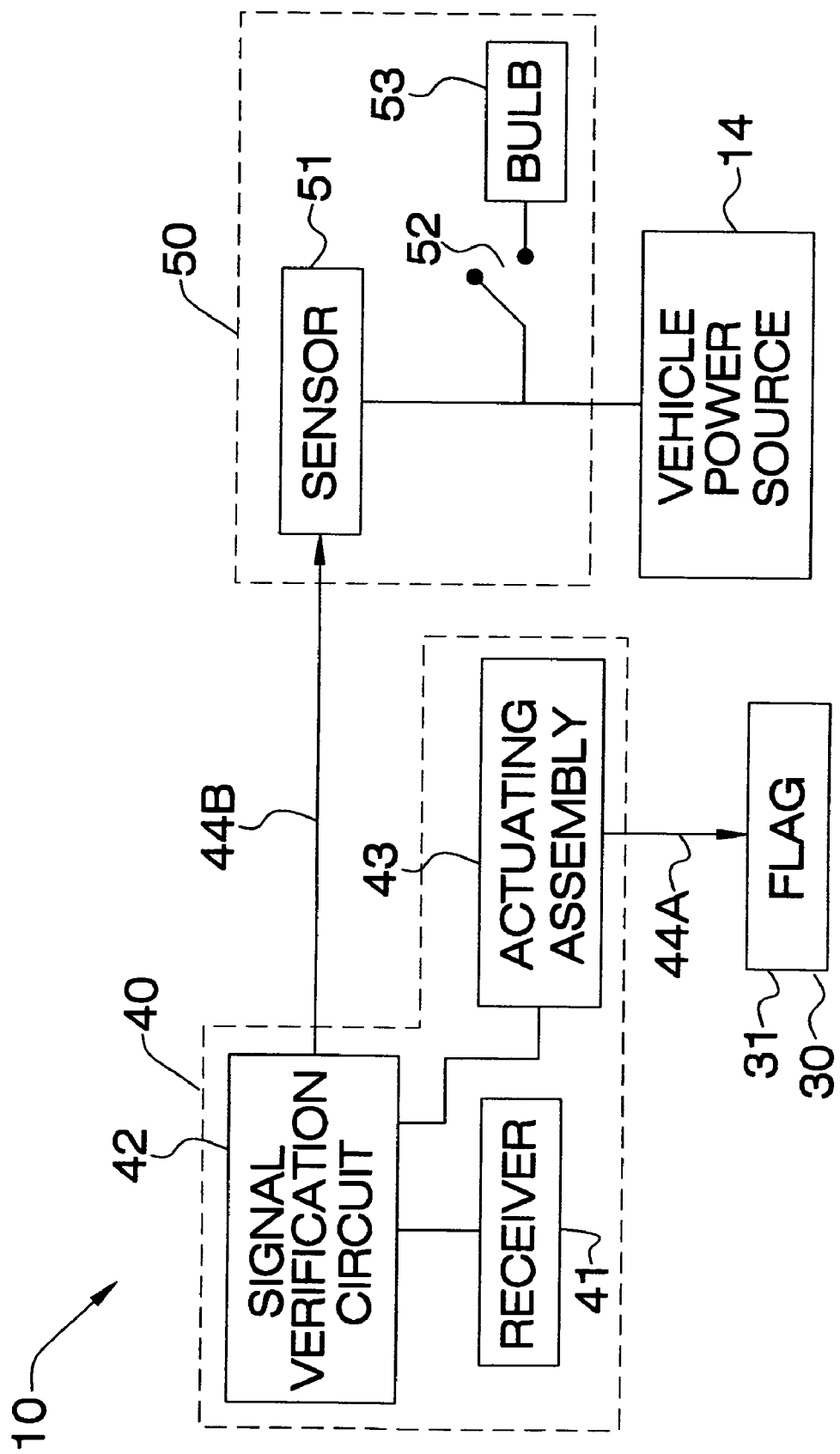
FIG. 7 is a schematic block diagram of the assembly shown in FIG. 1.

Referring to FIGS. 4 and 7, a mechanism 40 is included for selectively lowering and raising the flag 31 between the raised and lowered positions when the flag assembly 30 receives the wireless locating signal from the portable controller 20. The flag lowering and raising mechanism 40 includes a receiver 41 in wireless communication with the transmitter 21. Such a receiver 41 receives the wireless locating signal 24. A signal verification circuit 42 is electrically coupled to the receiver 41. Such a signal verification circuit 42 is vital for detecting and decoding the verification data stream, which is critical such that an identity of the portable controller 20 can advantageously and effectively be validated before the flag 31 is pivoted.

An actuating assembly 43 is electrically coupled to the signal verification circuit 42 and the flag 31 respectively. The signal verification circuit 42 generates and transmits first 44A and second 44B dependent control signals to the actuating assembly 10 that are important for instructing the actuating assembly 43 to pivot the flag 31 and activate the illuminating mechanism 50 (described herein below) respectively. The first 44A and second 44B control signals are simultaneously generated and transmitted during operating conditions.

Referring to FIGS. 4 and 7, the flag actuating assembly 43 includes an electric motor 45 that is electrically coupled to a vehicle power supply source 14. Such a motor 45 includes a drive shaft 46A and a cam 46B directly coupled, without the use of intervening elements, to a distal end 47 thereof, which is vital such that the drive shaft 46A and the cam 46B effectively rotate in sync about a circular path when the motor 45 is activated. An elongated piston 46C has a bottom end 48A directly connected, without the use of intervening elements, to the cam 46B. Such a piston 46C is rotatable about a first axis when the cam 46B rotates.

The bottom end 48A has a hook shape that is essential for effectively locking with the cam 46B. An arm 46D is pivotally mounted to the housing 35 and has a bottom flange 49 offset therefrom. Such a bottom flange 49 is directly and statically coupled, without the use of intervening elements, to a top end 48B of the piston 46C, which is critical such that the arm 46D is effectively caused to pivot about a second axis as the piston 46C rotates about the first axis. The first and second axes are non-parallel.

Referring to FIGS. 1, 2, 3 and 7, a mechanism 50 is included for automatically illuminating a distal end 38 of the flag 31 after the flag 31 is articulated to the raised position such that the illuminating mechanism 50 automatically deactivates when the flag 31 is articulated to the lowered position. Such an automatic illuminating mechanism 50 is electrically coupled to a vehicle internal power source 14. The automatic illuminating mechanism 50 includes a sensor 51 that is electrically coupled to the signal verification circuit 42, as is best shown in FIG. 7. Such a sensor 51 effectively receives the second control signal 44B.

A switch 52 and a bulb 53 are electrically coupled directly thereto, without the use of intervening elements. Such a switch 52 is medially disposed between the bulb 53 and an external power supply source 14, which is important such that the bulb 53 effectively receives power when the switch 52 is adapted to a closed position. The sensor 51 generates and transmits a control signal for toggling the switch 52 between an open position and the closed position when the flag 31 is pivoted to the lowered and raised positions respectively such that the bulb 53 simultaneously and automatically illuminates when the flag 31 is maintained at the raised position. Such an illuminated light bulb 53 advantageously further assists the vehicle owner in locating their automobile 11, especially at night time and in poorly lit surroundings.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wireless vehicle identification assembly for determining a location of a parked vehicle in a crowded parking lot, said wireless vehicle identification assembly comprising:
   a portable controller for generating and sending a wireless locating signal based upon a user input, said wireless locating signal having a preprogrammed verification data stream encoded therein;
   a flag assembly removably mounted to a top ledge of a window of the vehicle, said flag assembly including a flag directly and pivotally connected thereto such that said flag is free to swivel along an arcuate path located exterior of the vehicle;
   means for selectively lowering and raising said flag between the raised and lowered positions when said flag assembly receives said wireless locating signal from said portable controller; and
   means for automatically illuminating a distal end of said flag after said flag is articulated to the raised position such that said illuminating means automatically deactivates when said flag is articulated to the lowered position.

2. The assembly of claim 1, wherein said flag lowering and raising means comprises:

a receiver in wireless communication with said transmitter, said receiver receiving said wireless locating signal;

a signal verification circuit electrically coupled to said receiver, said signal verification circuit for detecting and decoding said verification data stream such that an identify of said portable controller can be validated before said flag is pivoted;

an actuating assembly electrically coupled to said signal verification circuit and said flag respectively, said signal verification circuit generating and transmitting first and second dependent control signals to said actuating assembly for instructing said actuating assembly to pivot said flag and activate said illuminating means respectively, said first and second control signals being simultaneously generated and transmitted during operating conditions.

3. The assembly of claim 2, wherein said flag actuating assembly comprising:

an electric motor electrically coupled to a vehicle power supply source, said motor including a drive shaft and a cam directly coupled to a distal end thereof such that said drive shaft and said cam rotate in sync about a circular path when said motor is activated;

an elongated piston having a bottom end directly connected to said cam, said piston being rotatable about a first axis when said cam rotates, said bottom end having a hook shape for locking with said cam;

an arm pivotally mounted to said housing and having a bottom flange offset therefrom, said bottom flange being directly and statically coupled to a top end of said piston such that said arm is caused to pivot about a second axis as said piston rotates about said first axis, said first and second axes being non-parallel.

4. The assembly of claim 1, wherein said automatic illuminating means comprises:

a sensor electrically coupled to said signal verification circuit, said sensor receiving said second control signal; and a switch and a bulb electrically coupled directly thereto, said switch being medially disposed between said bulb and an external power supply source such that said bulb receives power when said switch is adapted to a closed position;

wherein said sensor generates and transmits a control signal for toggling said switch between an open position and the closed position when said flag is pivoted to the lowered and raised positions respectively such that said bulb simultaneously and automatically illuminates when said flag is maintained at the raised position.

5. The assembly of claim 1, wherein said flag assembly comprises:

a U-shaped bracket having medial and lateral sides seated interior and exterior of the vehicle window, said U-shaped bracket having a bottom layer formed from rubber material and covering an entire surface area of said bottom layer such that said U-shaped bracket maintains frictional contact with the vehicle window; and a housing directly coupled to said lateral side of said U-shaped bracket and positioned exterior of the vehicle, said housing having a continuous hollow chamber formed therein and an open top end such that said chamber is in fluid communication with ambient surroundings;

said actuating assembly being partially seated within said chamber.

6. A wireless vehicle identification assembly for determining a location of a parked vehicle in a crowded parking lot, said wireless vehicle identification assembly comprising:

a portable controller for generating and sending a wireless locating signal based upon a user input, said wireless locating signal having a preprogrammed verification data stream encoded therein;

a flag assembly removably mounted to a top ledge of a window of the vehicle, said flag assembly including a flag directly and pivotally connected thereto such that said flag is free to swivel along an arcuate path located exterior of the vehicle;

means for selectively lowering and raising said flag between the raised and lowered positions when said flag assembly receives said wireless locating signal from said portable controller; and means for automatically illuminating a distal end of said flag after said flag is articulated to the raised position such that said illuminating means automatically deactivates when said flag is articulated to the lowered position, wherein said automatic illuminating means is electrically coupled to a vehicle internal power source.

7. The assembly of claim 6, wherein said flag lowering and raising means comprises:

a receiver in wireless communication with said transmitter, said receiver receiving said wireless locating signal;

a signal verification circuit electrically coupled to said receiver, said signal verification circuit for detecting and decoding said verification data stream such that an identify of said portable controller can be validated before said flag is pivoted;

an actuating assembly electrically coupled to said signal verification circuit and said flag respectively, said signal verification circuit generating and transmitting first and second dependent control signals to said actuating assembly for instructing said actuating assembly to pivot said flag and activate said illuminating means respectively, said first and second control signals being simultaneously generated and transmitted during operating conditions.

8. The assembly of claim 7, wherein said flag actuating assembly comprising:

an electric motor electrically coupled to a vehicle power supply source, said motor including a drive shaft and a cam directly coupled to a distal end thereof such that said drive shaft and said cam rotate in sync about a circular path when said motor is activated;

an elongated piston having a bottom end directly connected to said cam, said piston being rotatable about a first axis when said cam rotates, said bottom end having a hook shape for locking with said cam;

an arm pivotally mounted to said housing and having a bottom flange offset therefrom, said bottom flange being directly and statically coupled to a top end of said piston such that said arm is caused to pivot about a second axis as said piston rotates about said first axis, said first and second axes being non-parallel.

9. The assembly of claim 6, wherein said automatic illuminating means comprises:

a sensor electrically coupled to said signal verification circuit, said sensor receiving said second control signal; and a switch and a bulb electrically coupled directly thereto, said switch being medially disposed between said bulb and an external power supply source such that said bulb receives power when said switch is adapted to a closed position;

wherein said sensor generates and transmits a control signal for toggling said switch between an open position and the closed position when said flag is pivoted to the lowered and raised positions respectively such that said bulb simultaneously and automatically illuminates when said flag is maintained at the raised position.

10. The assembly of claim 6, wherein said flag assembly comprises:

a U-shaped bracket having medial and lateral sides seated interior and exterior of the vehicle window, said U-shaped bracket having a bottom layer formed from rubber material and covering an entire surface area of said bottom layer such that said U-shaped bracket maintains frictional contact with the vehicle window; and a housing directly coupled to said lateral side of said U-shaped bracket and positioned exterior of the vehicle, said housing having a continuous hollow chamber formed therein and an open top end such that said chamber is in fluid communication with ambient surroundings;

said actuating assembly being partially seated within said chamber.

11. A wireless vehicle identification assembly for determining a location of a parked vehicle in a crowded parking lot, said wireless vehicle identification assembly comprising:

a portable controller for generating and sending a wireless locating signal based upon a user input, said wireless locating signal having a preprogrammed verification data stream encoded therein;

a flag assembly removably mounted to a top ledge of a window of the vehicle, said flag assembly including a flag directly and pivotally connected thereto such that said flag is free to swivel along an arcuate path located exterior of the vehicle, wherein said flag assembly is formed from non-corrosive material;

means for selectively lowering and raising said flag between the raised and lowered positions when said flag assembly receives said wireless locating signal from said portable controller; and means for automatically illuminating a distal end of said flag after said flag is articulated to the raised position such that said illuminating means automatically deactivates when said flag is articulated to the lowered position, wherein said automatic illuminating means is electrically coupled to a vehicle internal power source.

12. The assembly of claim 11, wherein said flag lowering and raising means comprises:

a receiver in wireless communication with said transmitter, said receiver receiving said wireless locating signal;

a signal verification circuit electrically coupled to said receiver, said signal verification circuit for detecting and decoding said verification data stream such that an identify of said portable controller can be validated before said flag is pivoted;

an actuating assembly electrically coupled to said signal verification circuit and said flag respectively, said signal verification circuit generating and transmitting first and second dependent control signals to said actuating assembly for instructing said actuating assembly to pivot said flag and activate said illuminating means respectively, said first and second control signals being simultaneously generated and transmitted during operating conditions.

13. The assembly of claim 12, wherein said flag actuating assembly comprising:

an electric motor electrically coupled to a vehicle power supply source, said motor including a drive shaft and a cam directly coupled to a distal end thereof such that said drive shaft and said cam rotate in sync about a circular path when said motor is activated;

an elongated piston having a bottom end directly connected to said cam, said piston being rotatable about a first axis when said cam rotates, said bottom end having a hook shape for locking with said cam;

an arm pivotally mounted to said housing and having a bottom flange offset therefrom, said bottom flange being directly and statically coupled to a top end of said piston such that said arm is caused to pivot about a second axis as said piston rotates about said first axis, said first and second axes being non-parallel.

14. The assembly of claim 11, wherein said automatic illuminating means comprises:

a sensor electrically coupled to said signal verification circuit, said sensor receiving said second control signal; and a switch and a bulb electrically coupled directly thereto, said switch being medially disposed between said bulb and an external power supply source such that said bulb receives power when said switch is adapted to a closed position;

wherein said sensor generates and transmits a control signal for toggling said switch between an open position and the closed position when said flag is pivoted to the lowered and raised positions respectively such that said bulb simultaneously and automatically illuminates when said flag is maintained at the raised position.

15. The assembly of claim 11, wherein said flag assembly comprises:

a U-shaped bracket having medial and lateral sides seated interior and exterior of the vehicle window, said U-shaped bracket having a bottom layer formed from rubber material and covering an entire surface area of said bottom layer such that said U-shaped bracket maintains frictional contact with the vehicle window; and a housing directly coupled to said lateral side of said U-shaped bracket and positioned exterior of the vehicle, said housing having a continuous hollow chamber formed therein and an open top end such that said chamber is in fluid communication with ambient surroundings;

said actuating assembly being partially seated within said chamber.

* * * * *